Figure 1:
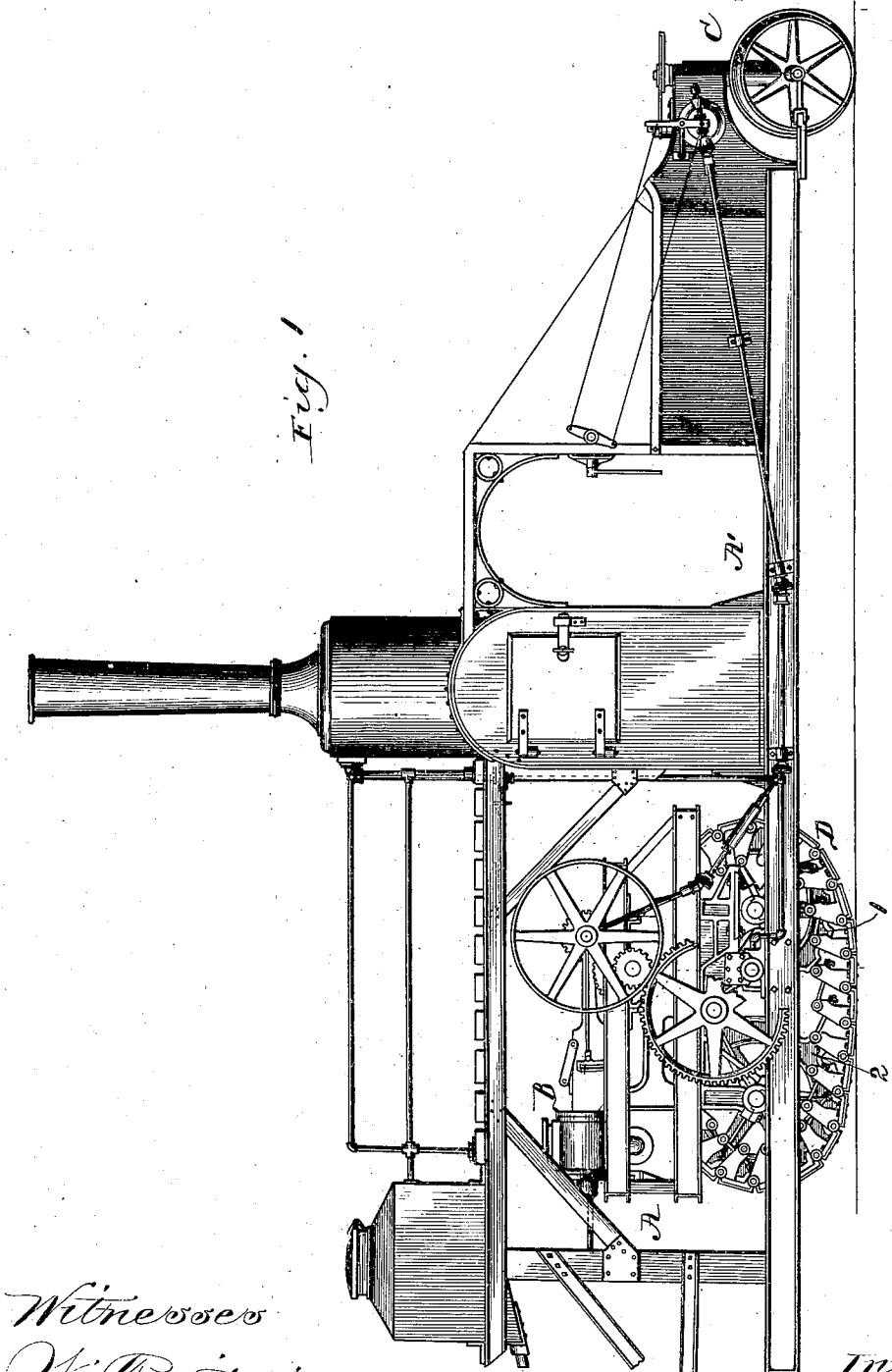

(No Model.) 6 Sheets—Sheet 1.

G. H. EDWARDS.
TRACTOR.

No. 425,600. Patented Apr. 15, 1890.

Witnesses
W. Rossiter
Fredk N. Mills

Inventor
George H. Edwards
By Chas. G. Page
Atty.

(No Model.) 6 Sheets—Sheet 2.

G. H. EDWARDS.
TRACTOR.

No. 425,600. Patented Apr. 15, 1890.

(No Model.) 6 Sheets—Sheet 3.

G. H. EDWARDS.
TRACTOR.

No. 425,600. Patented Apr. 15, 1890.

Witnesses
W. Rossiter
Fredk. H. Mills.

Inventor
George H. Edwards
By Chas. G. Page
Atty (No Model.) 6 Sheets—Sheet 4.

G. H. EDWARDS.
TRACTOR.

No. 425,600. Patented Apr. 15, 1890.

Witnesses
W. Rossiter
Fredk. H. Wells

Inventor
George H. Edwards
By Chas. G. Page
Atty.

(No Model.) 6 Sheets—Sheet 5.

G. H. EDWARDS.
TRACTOR.

No. 425,600. Patented Apr. 15, 1890.

Witnesses
W. Rosseter
Fredk. H. Mills

Inventor
George H. Edwards
By Chas. G. Page
Atty.

(No Model.) 6 Sheets—Sheet 6.

G. H. EDWARDS.
TRACTOR.

No. 425,600. Patented Apr. 15, 1890.

Witnesses
W. Rossiter
Fredk. H. Mill

Inventor
George H. Edwards
By Chas. G. Page
Atty.

UNITED STATES PATENT OFFICE.

GEORGE H. EDWARDS, OF CHICAGO, ILLINOIS.

TRACTOR.

SPECIFICATION forming part of Letters Patent No. 425,600, dated April 15, 1890.

Application filed July 6, 1889. Serial No. 316,721. (No model.)

*To all whom it may concern:*

Be it known that I, GEORGE H. EDWARDS, a citizen of the United States, residing at Chicago, in the county of Cook and State of Illinois, have invented a certain new and useful Improvement in Tractors, of which the following is a specification.

My invention relates to a construction of tractor or traction-engine involving the feature of an endless belt or track which passes about the supporting-wheels, and which is so operated therefrom that, conjointly with the advancement of the wheels, a broad track will be laid for them to roll upon.

The principal object of my invention is to render a tractor of such nature thoroughly practical and highly efficient as a machine for service upon all occasions involving the desirability of means for interposing between the wheels and the ground such extended area of bearing-surface as shall avoid the miring or sinking of the wheels into the earth, a service which I particularly have in view being that of plowing and otherwise cultivating the soil.

In traveling over a field for the purpose of plowing or cultivating the same the condition of the soil will practically necessitate not only the use of an endless track for the wheels to roll upon, but also the employment of means for so trussing or bracing such portions of the endless track as may be between the front and rear wheels as to cause the weight to be distributed throughout said portion of the track, which will thereupon provide a large area of surface arranged to bear upon the ground and sustain the weight throughout its entire area. In plowing or cultivating a field, however, it will almost invariably be found to present many obstructions other than softness of soil to the advancement of the machine, such obstructions being the furrows, ridges, and other irregularities of surface commonly incident to fields, and hence without some co-operating means for permitting the machine to be driven over such obstructions by a reasonable application of power the machine will be practically useless. In order to overcome such obstructions, the avoidance of slip on the part of the wheels is as necessary as the employment of a truss for bracing the track, and in this connection the provision of means for accommodating the trussed track to the obstruction over which it is to pass, so as to avoid loss of power and relieve the steering-wheels from unnecessary weight, while the traction device is surmounting or climbing over the obstruction, is just as much a necessity as the employment of means, as aforesaid, for trussing the track and preventing slip on the part of the wheels. To the attainment, therefore, of a practically-successful tractor involving the foregoing essential capabilities, I provide a tractor or traction-engine comprising an endless trussed belt or track, which is gear-connected with and driven from one or more of the main supporting-wheels, and a jointed frame adapted to provide both a rocking truck, which travels upon the endless trussed track, and a frame portion, which is hinged to and in part supported from the rocking truck, by which arrangement the lower leaf of the track, which will at all times be straight and rigid as against upward pressure, may by the rocking action of the truck adapt itself to the inclination of the ridge or furrow over which it is to climb, and in thus climbing over a ridge in the field the track will adapt itself to the inequalities of surface, and the steering-wheels of the frame, to which the track is hinged, will be relieved of extra weight, while at the same time the full power of the traction device will be utilized as a propelling agent. The engine is carried by the rocking truck, while the plows or other devices that are to be drawn are attached to the frame portion, which is connected with the rocking truck by a rocking joint, and which may hereinafter be termed the "main frame" in contradistinction to the rocking-truck frame. The main frame is provided with one or more steering-wheels, and it may also carry the boiler-furnace and boiler. The water-tank could of course be arranged upon the main frame, which carries the boiler-furnace and boiler; but as a further feature of improvement the water-tank is arranged within the space that is bounded by the endless track, the object of this disposition of the water-tank being to permit the trussed track to sustain its weight and to dispose of it in an exceedingly con enient way. The endless track can be trussed by various constructions of truss, and the gear-connection between one or more of the rocking-truck wheels and the endless track can be effected in any suitable way. Power from the engine can be supplied to one or more of the engine-truck wheels or one or more of the axles through the medium of chain or wheel gearing, and as a further feature of improvement steam-connection between the boiler and engine and water-connection between the tank and the boiler can be made through the rocking joints of the jointed frame.

Figure 2:
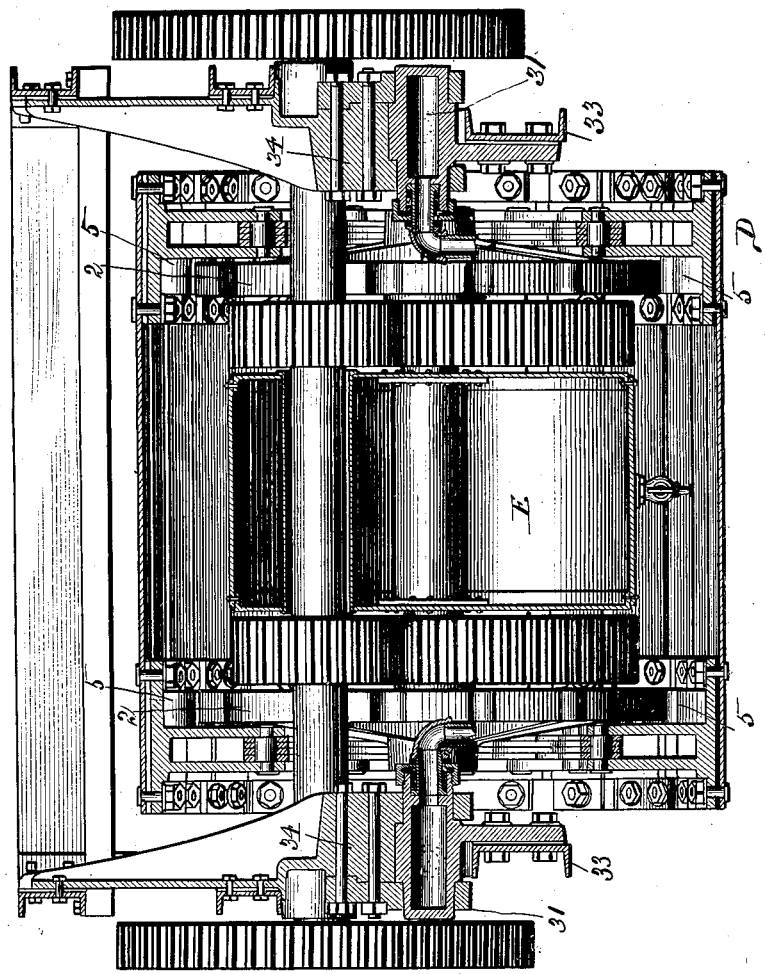
Figure 3:
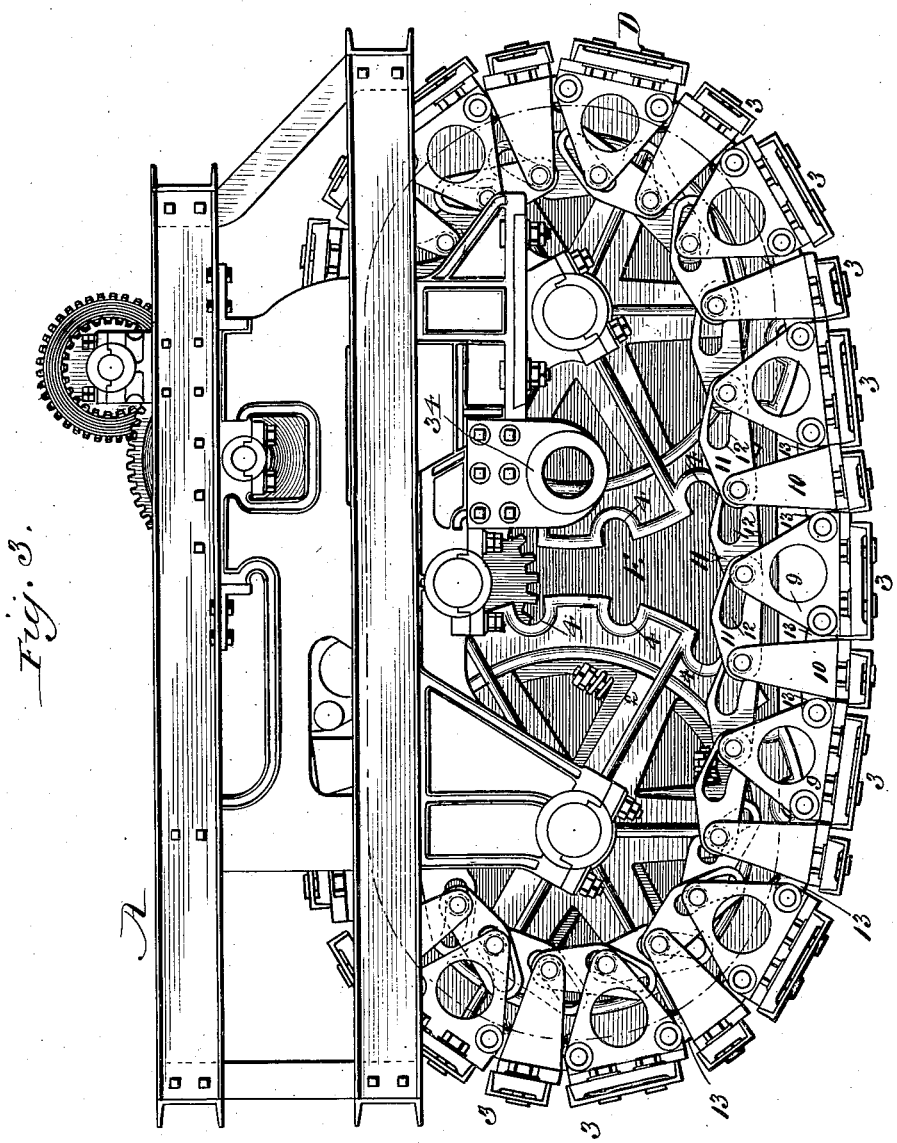
Figure 4:
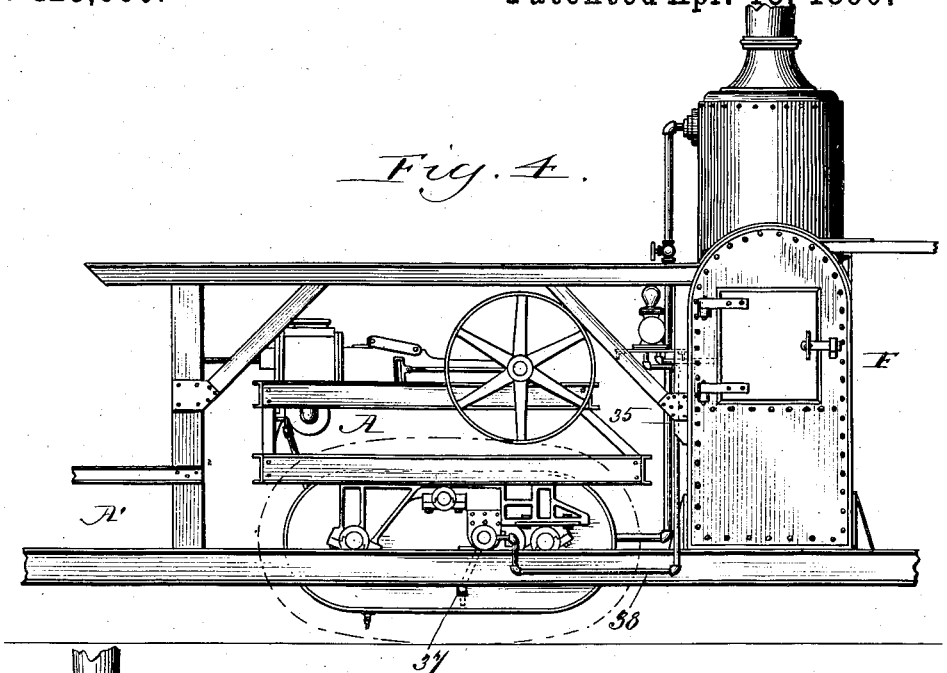
Figure 5:
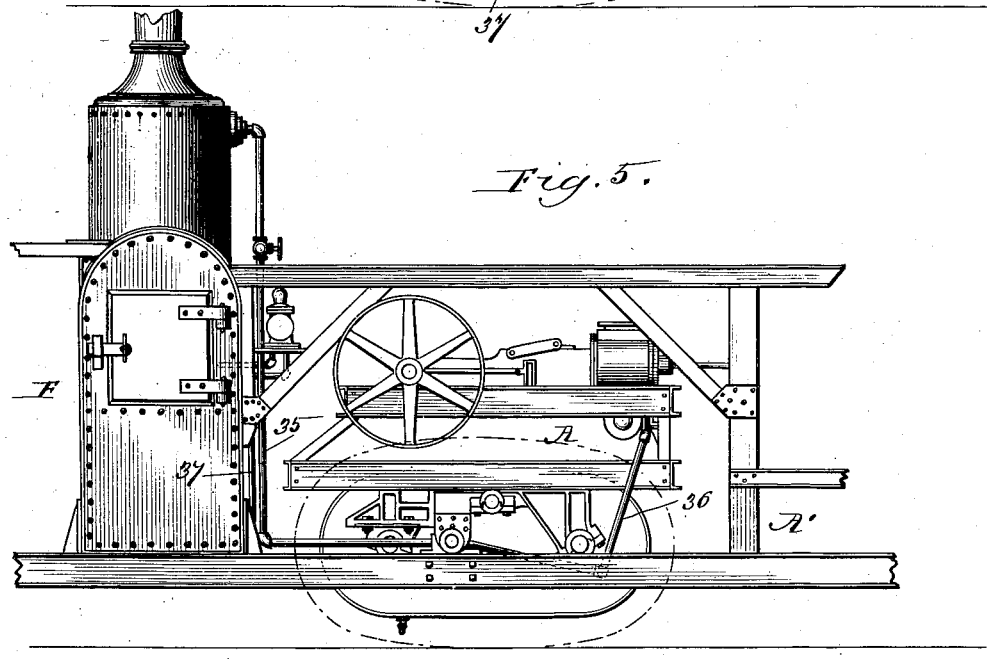
Figure 6:
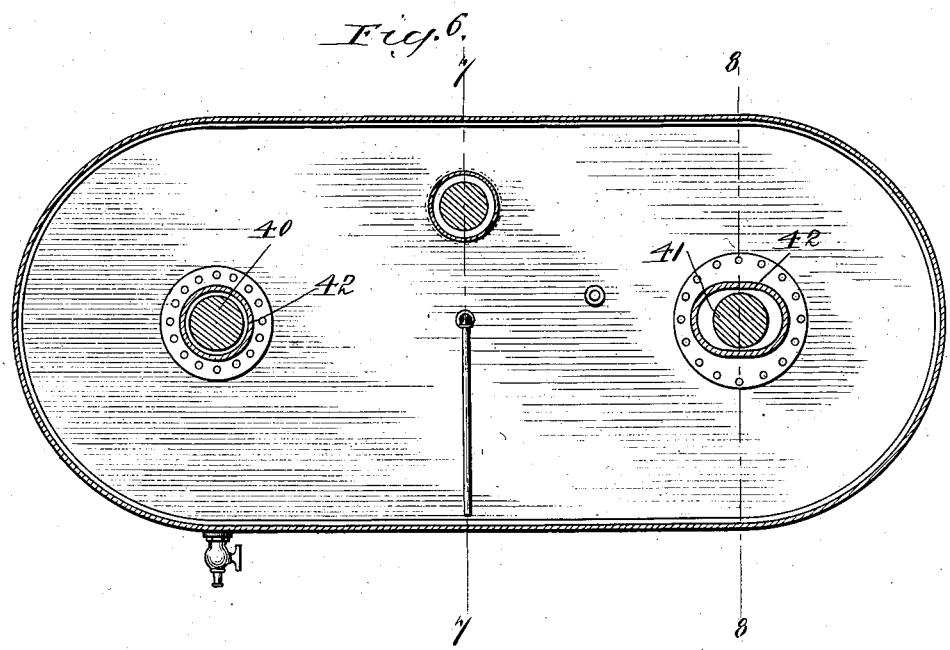
Figure 7:
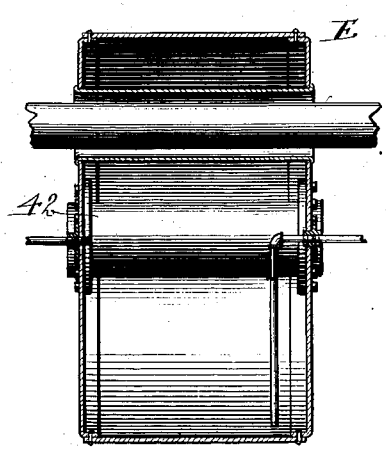
Figure 8:
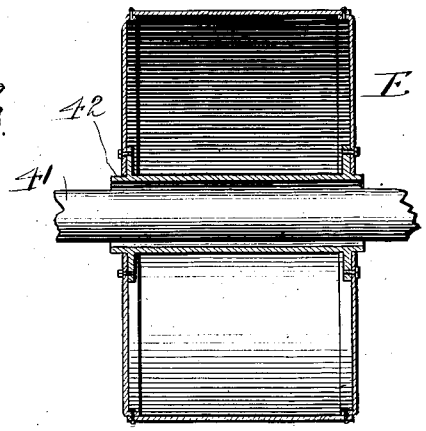
Figure 9:
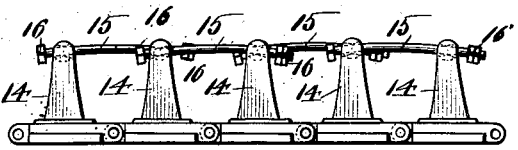
Figure 10:
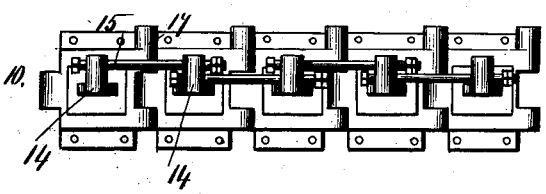
Figure 11:
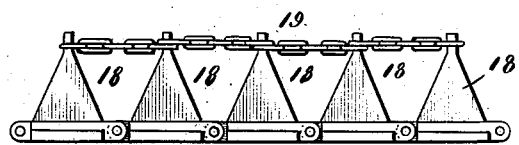
Figure 12:
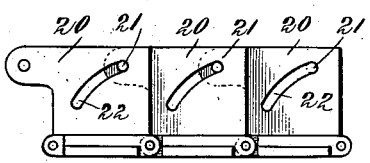
Figure 13:
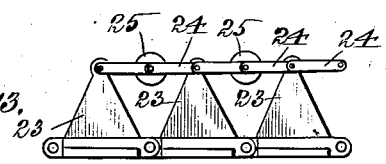
Figure 14:
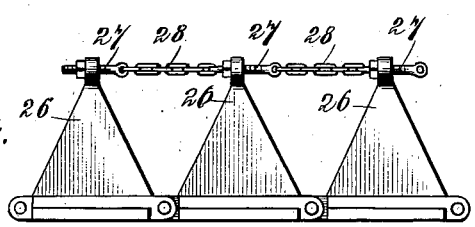
Figure 15:
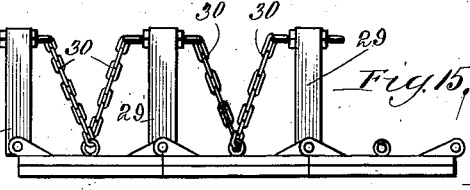

In the accompanying drawings, Figure 1 represents in side elevation a tractor embodying the principles of my invention, the portion of the frame in rear of the traction device being broken away. Fig. 2 represents a cross-section on line 2 2 in Fig. 1. This view illustrates portions of the steam and water pipes that are connected with the rocking joints. Fig. 3 represents the rocking truck and traction device in side elevation, the construction of endless folding truss shown in this figure as a means for bracing the endless track being somewhat different in construction from the truss in the preceding figures. Figs. 4 and 5 are in the nature of diagrams or skeleton views, respectively representing opposite side portions of the traction device and mainly intended to illustrate the steam-pipe connections between the boiler and the engine and the water-pipe connection between the tank and the boiler. Fig. 6 is a section taken on a vertical central plane through the water-tank, so as to mainly illustrate in cross-section the front and rear axles and a rotary shaft which extend through the tank. Fig. 7 shows a cross-section through the water-tank on line 7 7 in Fig. 6. Fig. 8 is a similar section through the water-tank on line 8 8 in Fig. 6. Fig. 9 is a side elevation, and Fig. 10 a plan, of a portion of a truss differing slightly in construction from the truss shown in Fig. 1. Fig. 11 represents in side elevation a portion of a truss in which the struts or braces are chain-connected at their inner ends. Fig. 12 shows in side elevation a portion of a truss involving braces which consist of blocks connected together by limited sliding connections. Fig. 13 shows in side elevation a portion of a truss in which triangular braces are connected by jointed links. Fig. 14 shows in side elevation a portion of a truss in which triangular braces are connected by chains that are attached to adjustable bolts. Fig. 15 shows in side elevation a portion of a truss in which the braces are connected with slats of the endless bolt or track by chains.

The frame of the machine is herein separated into the two prominent divisions or sections A A', which are connected together by trunnions or rocking joints, so that the frame-section A, which is desirably the shorter of the two, may rock independently of the frame-section A', to which it is jointed.

The frame-section A' herein constitutes a truck-frame whereon an engine B may be mounted, while the frame-section A' may be supported both by its jointed connection with the frame-section A and by any suitable arrangement of steering wheel or wheels which can be arranged at its forward end, as at C.

The frame-section A is supported upon the axles of a pair of front wheels 1 and a pair of rear wheels 2, and, if desired, one or more pairs of wheels arranged to intervene between said front and rear wheels could be employed in case it should be desired to lengthen said frame-section or truck-frame. The endless belt or track D passes about said wheels, which are therefore arranged within the space that is bounded by the endless track. The endless track is preferably composed of a series of transversely-arranged planks or slats 3, which are hinged together so as to provide an endless flexible track. The planks or slats could be made of wood; but for the purpose of strength, durability, and comparative lightness, they are preferably formed of channel-iron. One or more, but preferably all, of the wheels 1 and 2 are gear-connected with the endless track, and to such end the wheels can be provided with peripherally-arranged recesses 4, adapted for engaging with lugs or teeth 5 upon the inner side of the endless track, as in Fig. 2, it being understood that the said track can be provided with two sets of such teeth, with the teeth of each set arranged in endless series. By means of such gear-connection the wheels are prevented from slipping upon the track and the full leverage of the driving-wheels obtained. Any one or more of the wheels can be driven by chain or wheel gearing arranged between the engine and the wheels on their axles; but I prefer driving the rear wheels from the engine by some suitable power-transmitting connection.

The endless track is provided along its inner side with an endless folding truss, which is desirably duplicated so as to provide two parallel lines of trussing, respectively adjacent to the vertical planes in which side wheels are arranged. Various constructions of jointed or folding truss can be employed, it being, however, essential to provide a folding truss of such character that it will not only fold to permit the endless track to pass about the wheels and unfold to permit said track to straighten out between the forward and rear wheels, but also unfold only to such extent as will allow the track portions which may be between the front and rear wheels to straighten out, whereby the lower leaf of the endless track will be braced and held rigid against upward pressure and lie upon the ground as a broad flat bearing which sustains the weight of the truck-frame and engine in such way that said weight will be distributed throughout the leaf or lower fold of an endless track, whereon the wheels are arranged to roll.

In the construction of folding truss illustrated in Fig. 1 the struts or braces 6 are secured upon the track-slats, and at their inner ends connected together by arms or rods 7, each of which is at one end pivoted to one brace and at its opposite end extended through a hole in the next succeeding brace, the terminal of the rod being at a point back of the second-mentioned brace provided with a nut 8, which can be adjusted so as to vary the extent of separation between the two inner ends of the said braces when the truss is unfolded. By such arrangement the truss can be adjusted in conformity with the radius of the wheel about which the slatted belt is to pass.

In Fig. 3 triangular braces 9 and oblong braces 10 are secured upon the slats and at their inner ends connected by chord-links 11, which are pivoted to the braces 10 and connected with the braces 9 by means of pivot-bolts, which are secured to the braces and arranged to extend through slots 12 in the chord-links. Arms 13 are made rigid with the braces 10 and pivotally connected with the braces 9, thereby providing hinge-joints in the outer chord of the truss and hinging the slats together. In Figs. 9 and 10 the slats are hinged together and provided with braces 14, which are connected together by rods 15. These rods extend and can slide through holes in the braces, and are provided with nuts 16 upon their ends, whereby the extent of unfolding action on the part of the truss can be adjusted. Fig. 10 also illustrates teeth 17, with which a driving-wheel can engage. In Fig. 11 the slats can be hinged together in any suitable way and provided with triangular braces 18, which are connected together by chains 19. In Fig. 12 the slats are understood to be hinged together in any suitable way and provided with braces 20, each having a stud 21 arranged to engage in a slot formed through the next brace. In Fig. 13 the slats are hinged together and provided with triangular braces 23, which are connected together by jointed links 24, carrying small wheels or rollers 25 at their middle joints, it being observed that with this construction the drive-wheel should have an annular shoulder, against which the small rollers or wheels will strike, so as to throw the links off dead-centers. In Fig. 14 the slats are hinged together and provided with triangular links 26. Eyebolts 27 are adjustably secured to the inner ends of said braces, and short chains 28 are attached to the eyebolts. In Fig. 15 the slats are hinged together and provided with braces 29, which are connected with the slats by chains 30. With regard to the several constructions of truss illustrated in Figs. 9 to 15, inclusive, it will be understood that while all of said constructions involve a like principle they also involve different constructions. These several different constructions have their respective merits and constitute the subjects of applications made by me for Letters Patent, it being here noted that while the principles of these constructions are herein represented certain differences in details will be found in my said applications.

The frame-section A, which may be termed the "engine-truck," is connected with the main frame A' by rocking joints consisting of trunnions 31, which are secured to the channel-iron side bars 33 of the main frame, and bearings 34, which are rigid with the engine-truck and fitted to turn upon the trunnions 31, by which arrangement the engine-truck can rock independently of the main frame. This independent rocking action of the engine-truck permits the slatted track to adapt itself to any irregularities of the ground over which it may pass, and in passing over a ridge or the like the lower leaf of the track, which is rigid as against upward pressure, will be permitted to lie flat upon the inclination of the ground. If the engine-truck were rigid with the main frame, the full leverage of the driving-wheels could not be utilized, and undue weight would be thrown upon such steering-wheels as will be employed at the forward end of the machine; but by thus providing a rocking connection between the engine-truck and the main frame the track will adapt itself to irregularities of the ground without materially altering the portion of the weight normally carried by the steering-wheels and the full leverage and power of the engine-truck wheels will be utilized.

The boiler-furnace F is arranged upon the main frame in advance of the engine-truck, and steam from the boiler is desirably carried to an engine upon the engine-truck through one of the trunnions, which serve as pivotal connections between the engine-truck and the main frame. The water-tank E is also desirably arranged within the space that is bounded by the endless track, and water from the same also conducted to the engine through one of the trunnions 31. To such end the trunnions are made hollow or chambered and connections made from one of the trunnions with the boiler and the engine, while on the other hand connections are made from the remaining trunnion with the water-tank and boiler, as indicated in Figs. 2, 4, and 5, wherein a steam-pipe 35 leads from the boiler to one of said trunnions and a steam-pipe 36 leads from said trunnion to the engine, while on the other hand a water-conducting pipe 37 leads from the tank E to the remaining trunnion, and a water-conducting pipe 38 leads from said trunnion to the boiler as a means for applying the same. The axles 40 and 41 extend through and support the water-tank E, which will be provided with tubular bearings 41, which extend from side to side of the tank for the axles to pass through, as in Figs. 6, 7, and 8.

What I claim as my invention is—

1. The combination, substantially as hereinbefore set forth, of a main frame provided with one or more steering-wheels, a rocking engine-truck jointed to the main frame and carrying an engine, and an endless trussed track arranged for the engine-truck wheels to roll upon and geared to said wheels.

2. The combination, substantially as hereinbefore set forth, of the rocking engine-truck carrying an engine and supported upon an endless track, a main frame carrying a boiler-furnace, and steam-connection between the boiler and the engine passing through one of the joints between the engine-truck and the main frame.

3. The combination, substantially as hereinbefore set forth, of the engine-truck, an endless track upon which the engine-truck is supported, and a water-tank supported within the space that is bounded by the endless track.

4. The combination, substantially as hereinbefore set forth, of the engine-truck, an endless track upon which the engine-truck is supported, a water-tank supported within the space which is bounded by the endless track, a main frame to which the engine-truck is pivoted, a boiler-furnace and boiler upon the main frame, and connection between the water-tank and the boiler.

GEORGE H. EDWARDS.

Witnesses:
    CHAS. G. PAGE,
    ANNIE COATES.